United States Patent [19]
Ekström

[11] 3,767,999
[45] Oct. 23, 1973

[54] CONTROL MEANS FOR STATIC CONVERTERS

[75] Inventor: Åke Ekström, Ludvika, Sweden

[73] Assignee: Allmanna Svenska Elektriska Aktiebolaget, Vasteras, Sweden

[22] Filed: May 22, 1972

[21] Appl. No.: 257,466

[30] Foreign Application Priority Data
June 22, 1971 Sweden..........................8067/71

[52] U.S. Cl..................................... 321/18, 321/40
[51] Int. Cl. ............................................ H02m 1/08
[58] Field of Search ...................... 321/5, 18, 38, 40

[56] References Cited
UNITED STATES PATENTS

| | | | |
|---|---|---|---|
| 3,536,985 | 10/1970 | Ekstrom............................ | 321/18 X |
| 3,551,778 | 12/1970 | Ekstrom................................ | 321/5 |
| 3,582,755 | 6/1971 | Liss et al................................ | 321/5 |

Primary Examiner—A. D. Pellinen
Attorney—Jennings Bailey, Jr.

[57] ABSTRACT

An arrangement for phase angle control of converters which is intended to deliver to a control device for the converter rectifier a signal to set the phase angle of the control pulses includes a control circuit to the input side of which is delivered the difference between the real value and a desired value of the converter current. When the control circuit is stationary, the difference between the current values as well as the signal delivered to the control device is zero. The circuit includes a compensator connected between the input side and the output side of the control circuit, the input side of the compensator being connected to the control circuit over a connecting member which is briefly connected in by the control pulses to the converter rectifiers. The output side of the compensator is connected to the output side of the control circuit in such a way that the output signal of the compensator is subtracted from the original output signal of the control circuit.

5 Claims, 3 Drawing Figures

CONTROL MEANS FOR STATIC CONVERTERS

BACKGROUND OF THE INVENTION

1. Field of the Invention

The present invention relates to a means for phase angle control of a converter. This phase angle control is performed by means of a control circuit to the input side of which is connected the difference between the real value and a desired value of the converter current and the control circuit is of the type in which control intervention is continued until the real value of the current is equal to the desired value, i.e., the control error and thus the input signal to the control circuit are zero. The control has an integrating characteristic.

2. The Prior Art

A converter is mainly controlled by setting the control angle for the converter rectifiers and this setting is usually performed — particularly with converters for the transmission of high voltage direct current — by means of a current regulation which in turn may be subordinate to a second regulation, for example power regulation. As mentioned, the current control is performed by comparing the real value of the current with a desired value and the difference between these two values is then supplied to a control circuit which delivers a signal to the control pulse device of the converter which, in accordance with said signal, delivers control pulses having a certain control angle.

A converter with current regulation having an integrating characteristic is described in U.S. Pat. No. 3,551,778. The control of the angle of this converter is carried out in accordance with the time of the period of an alternating current network connected to the converter. In principle this period time is measured constantly and divided by the pulse number of the converter, thus giving a control pulse for each such time interval or fraction of the period time. The series of control pulses is trimmed in by a signal from a control amplifier, said signal being dependent on the current error and giving an extension or shortening of said time intervals. The function can be described by the expression $T/n - t + \Delta t$, where $T$ is the period time, n the pulse number, $t$ the time since the last control pulse and $\Delta t$ the signal from the control amplifier. A control pulse is emitted when this expression becomes zero. This continues until said signal becomes zero, after which the converter is controlled only in accordance with the period time. This condition is considered as the stationary condition when the real value of the current is equal to the desired value. If there are deviations between these two values $\Delta t$ will be positive or negative and the control angle is altered accordingly until $\Delta t$ becomes zero.

To describe it more completely, the course of events is that a current error, i.e., a deviation between the real and desired value of the current 7 gives a signal $\Delta t$ which causes an alteration in the control angle of the rectifiers. This causes an alteration in the direct voltage of the converter, which endeavours to eliminate the current error. The polarity of the voltage alteration with respect to the current error depends on whether the converter is operating as a rectifier or as an inverter. If the current is too great in relation to the desired value, the direct voltage must be decreased if the converter is operating as a rectifier and increased if it is operating as an inverter. In both cases the abnormally high current causes an increased control angle. Conversely, too little current causes a decrease in the control angle.

Due to the inertia of the system, primarily because of the smoothing reactor on the DC side of the converter, a certain voltage alteration is necessary for a certain time in order to alter the current in the correct direction. This means that when the current has at last reached its correct value, the control angle and thus the voltage has attained such a value that the current continues to alter and a new current error occurs having opposite polarity, which requires an alteration of the control angle and voltage in the opposite direction. It will therefore take a certain time before control angle, voltage and current achieve their correct values. In order to avoid too much oscillation, therefore, the above-mentioned control amplifier may be designed with low amplification but the regulation will then take place slowly. If the regulation is to be rapid the amplification in the control amplifier must be high so that $\Delta t$ acquires a high value and gives a strong alteration of the voltage and thus a rapid alteration of the current. However, the stability will then be altered so that violent disturbances may be dangerous. The slow system may also jeopardize the stability, for instance in networks with many disturbances and rapid changes of current and voltage.

The choice of control amplifier with respect to speed and stability is therefore always a question of compromise and the object of the present invention is to construct an input circuit for the system which will stabilise the regulation process, thus permitting a better control amplifier so that both speed and stability can be increased. In analogous control systems various ways have been known for a long time for achieving such increased speed and stability, but known solutions from analogous systems cannot be used just like that in the above control system for a converter. This system is a so-called "sampled" system, which means that it is only the value of the signal $\Delta t$ at the actual moment of firing, i.e., when control pulses are emitted to the rectifiers, which is of any importance, whereas any alterations between the firing moments are not registered. The introduction of a derivation of the signals in the control amplifier in accordance with the principles used in analogous systems would therefore cause an amplification of any overtones since their derivaties at the moment of firing would dominate over the fundamental signal.

SUMMARY OF THE INVENTION

Instead, it is proposed according to the invention to introduce a compensation for intervensions which are produced and this is done by introducing into the input circuit of the system a compensator which subtracts from the incoming signal a magnitude dependent on previous signals. The control system is thus constructed with a control circuit to the input side of which is delivered the difference between the real value and the desired value of a converter current. The control circuit has such a characteristic that, when stationary, the difference between the current values, as well as the signal delivered to the control device, is zero. A compensator is connected between the input side and the output side of the control circuit, the input side of a compensator being connected to the control circuit over a connecting member which is briefly connected in by the control pulse to the converter. The output side of the compensator is so connected to the output side of the control circuit that the output signal of the compensator is subtracted from the original output signal of the control circuit.

Since the current error signal is dampened in this way by the compensator, a stronger amplification can be permitted in the control amplifier, and thus more rapid control without risk of a large swing in the current. Thus both the speed and the stability are improved.

BRIEF DESCRIPTION OF THE DRAWINGS

The invention will be further described with reference to the accompanying drawings in which.

DESCRIPTION OF THE PREFERRED EMBODIMENTS

Figure 1:
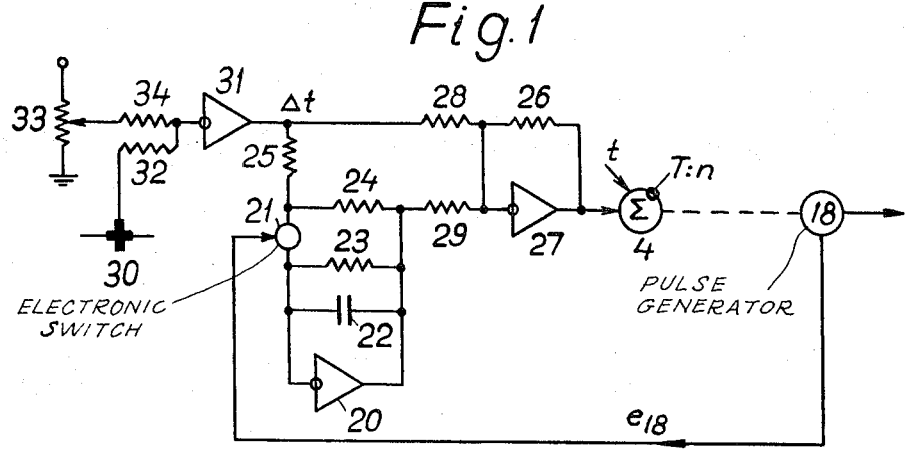
FIG. 1 shows a means for current regulation of a converter according to the above-mentioned U.S. Pat. No. 3,551,778 FIG. 1, this means being modified and provided with a compensator in accordance with the invention.

FIG. 1, as mentioned, shows a means for current regulation according to FIG. 1 in the above-mentioned U.S. patent. The FIGS. 30 – 34 indicate the current regulation shown there with the real value transducer 30, desired value transducer 33, input resistors 32, 34 and control amplifier 31. The control amplifier 31 is connected to the summation member 4 in said FIG. 1, which member is in turn connected to a pulse generator 18 by way of a group of components not shown here. In stationary condition the output $\Delta t$ from 31 is zero, which means that this current regulation has integrating characteristics.

According to the invention a compensator circuit 20-24 is connected between the control amplifier 31 and the summation member 4. It consists mainly of an amplifier 20 with capacitive feedback 22. The amplifier 20 is connected over an electronic switch 21 and the resistor 25 to the output from the control amplifier 31. The outputs from the amplifiers 20 and 31 are connected over parallel input resistors 28, 29 to the input of a third amplifier 27 provided with resistive feedback 26, this third amplifier being in turn connected to the summation member 4, the function of which has been described in the above-mentioned patent. The amplifier 20 is also provided with a resistive discharge circuit 23.

Figure 2:
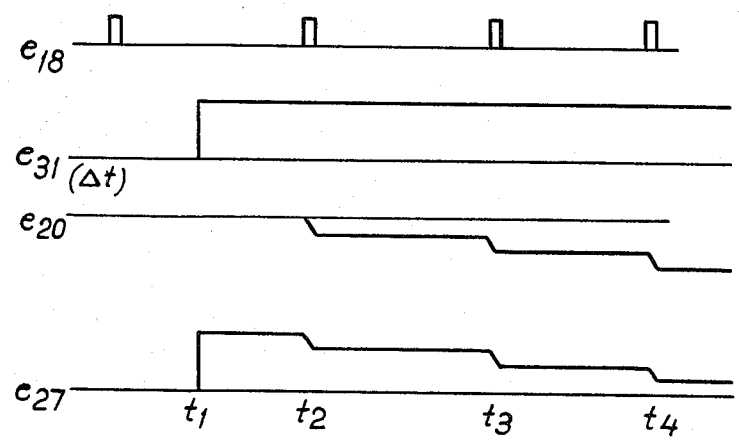
FIG. 2 shows the signals at the various stages in such a connection.

The signals at the various stages are seen in FIG. 2 where the first row $e_{18}$ indicates the control pulses from the control pulse transducer 18 whereas the second row $e_{31}$ indicates the output signal from the control amplifier 31. As long as the real value of the current is equal to the desired value, the signal $e_{31}$ is equal to zero and the control pulses $e_{18}$ follow each other with the same interval $T/n$. At the moment $t_1$ it is supposed that a deviation occurs between the real value and the desired value of the current, which affects the moment $t_2$ when the next control pulse arrives. Depending on the polarity of the signal $e_{31}$, which is the same as the previously mentioned signal $\Delta t$, the pulses $e_{18}$ will be accelerated or delayed according to whether the real value of the current is to low or too high.

At the moment $t_2$, the connecting member 21 will also become conducting and the amplifier 20 is therefore connected to the amplifier 31 while the control pulses $e_{18}$ are in existence. Depending on the amplification factor of the amplifier 20 and its feedback circuit 22, 23, 24, a signal $e_{20}$ will appear in the amplifier 20 at a certain speed and achieving a certain magnitude. The amplifier shown is an inverting amplifier and the signal $e_{20}$ will therefore have opposite polarity to $e_{31}$. $e_{20}$ will therefore be subtracted from $e_{31}$ at the input to the amplifier 27 so that the signal $e_{27}$ at the next firing point $t_3$ has decreased by the amount $e_{20}$ in relation to $e_{31}$. At this moment, therefore, the time alteration for $e_{18}$ will be less than at $t_2$.

Furthermore, at the moment $t_3$ there is a renewed connection of 20 to 31, whereupon the signal $e_{20}$ increases so that the reduction of $e_{27}$ at the next firing moment $t_4$ will be slightly greater again.

The signal $e_{31}$ or $\Delta t$ is thus written off, so to say, and by suitable dimensioning of the circuit 20-25 in relation to the main circuits of the converter, this writing off can take place at approximately the same rate as that at which the direct current of the converter adapts itself to its desired value. As a result of this, the amplifier 31 can be dimensioned with high amplification so that rapid regulation is obtained without jeopardising the stability, since the compensator circuit 20-25 counteracts any over-regulation of the current.

Because of the discharge circuit 23 for the amplifier 20, the signal $e_{20}$ will have a tendency to fade away so that this signal disappears.

Figure 3:
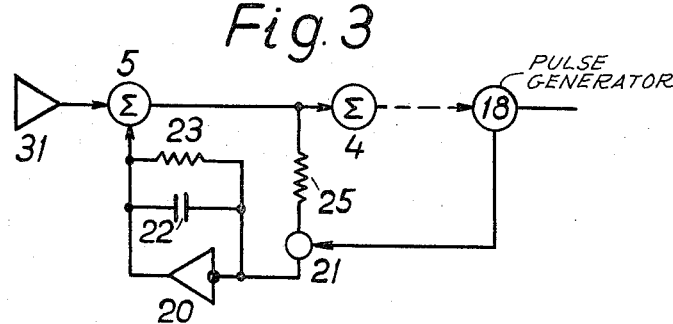
FIG. 3 shows a variant of the connection in FIG. 1.

FIG. 3 shows another connection of the compensator 20-23, where its influence decreases gradually as the output signal from the amplifier 31 disappears. In this case, the compensator forms a sort of feedback on the output side of the amplifier 31 by connection of a summator 5. To this the output signals from 31 and from 20 are connected, the output signal from 5 being connected to the input side of 20. The output signal from 5 will therefore be $e_5 = e_{31} - e_{20}$. By suitable dimensioning of the compensator and its input resistor 25 in relation to the amplifier 31, therefore, the total signal $e_5$ is made to face out in a suitable time and a large amplification factor in 31 and thus rapid regulation can be permitted.

I claim:

1. Means for phase angle control of converters, which means is intended to deliver to a control device (18) for the converter rectifiers a signal to set the phase angle of the control pulses to said rectifiers, said means comprising a control circuit (31,4), means to deliver to the input side of the control circuit the difference between the real value and a desired value of the converter current, said control circuit having such a characteristic that, when stationary, the difference between said current values, as well as the signal delivered to the control circuit, is zero, said circuit comprising a compensator (20-24), means responsive to such current value difference to reduce the value of such current value difference and thereby reduce oscillations caused by such difference, said compensator means being connected between the input side (31) and the output side (4) of the control circuit, the input side of said compensator being connected to the control circuit, said compensator means including a connection member (21) which is briefly connected in by the control pulses to the converter rectifiers, the output side of the compensator means being so connected to the output side (4) of the control circuit that the output signal of the compensator means is subtracted from the original output signal of the control circuit.

2. Means according to claim 1, said subtracting takes place in a summator (27,5) to the input side of which are connected in parallel to the input side (31) of the control circuit and the compensator means (20-24), the summator being connected to the output side (4) of the control circuit.

3. Means according to claim 2, in which the input side of said compensator means (20-24) is connected to the input side (31) of the control circuit.

4. Means according to claim 2, in which the input side of the compensator means (20-24) is connected to the output side of the summator (5).

5. Means according to claim 1, in which the compensator means (20-24) is provided with a discharge circuit (23).

* * * * *